(12) United States Patent
Yan et al.

(10) Patent No.: US 11,972,914 B2
(45) Date of Patent: Apr. 30, 2024

(54) DISCONNECTOR FOR SWITCHGEAR

(71) Applicant: ABB Schweiz AG, Baden (CH)

(72) Inventors: Congming Yan, Xiamen (CN); Liqun Huang, Xiamen (CN); Xin Liu, Xiamen (CN); Andre Bieri, Xiamen (CN)

(73) Assignee: ABB SCHWEIZ AG, Baden (CH)

( * ) Notice: Subject to any disclaimer, the term of this patent is extended or adjusted under 35 U.S.C. 154(b) by 100 days.

(21) Appl. No.: 17/753,728

(22) PCT Filed: Feb. 7, 2020

(86) PCT No.: PCT/CN2020/074493
§ 371 (c)(1),
(2) Date: Mar. 11, 2022

(87) PCT Pub. No.: WO2021/155565
PCT Pub. Date: Aug. 12, 2021

(65) Prior Publication Data
US 2022/0384127 A1 Dec. 1, 2022

(51) Int. Cl.
*H02B 3/00* (2006.01)
*H01H 3/40* (2006.01)
(Continued)

(52) U.S. Cl.
CPC ............ *H01H 33/022* (2013.01); *H01H 3/40* (2013.01); *H01H 9/0072* (2013.01); *H01H 9/02* (2013.01); *H01H 31/28* (2013.01); *H02B 3/00* (2013.01)

(58) Field of Classification Search
None
See application file for complete search history.

(56) References Cited

U.S. PATENT DOCUMENTS 4,649,244 A * 3/1987 Baginski .................. H01H 3/30
200/325
6,759,617 B2 * 7/2004 Yoon ..................... H01H 33/666
218/120
(Continued)

FOREIGN PATENT DOCUMENTS

CN  205723312 U  11/2016
CN  105047466 A   3/2018
(Continued)

OTHER PUBLICATIONS

International Search Report and Written Opinion, issued by the ISA/CN National Intellectual Property Administration, regarding corresponding patent application Serial No. PCT/CN2020/074493; dated Oct. 26, 2020; 9 pages.
(Continued)

*Primary Examiner* — Courtney L Smith
(74) *Attorney, Agent, or Firm* — Greenberg Traurig, LLP

(57) ABSTRACT

Embodiments of a disconnector and a switchgear, wherein the disconnector comprises a contact assembly operable to change a status of a circuit, the disconnector arranged in the circuit; shafts adapted to be driven to rotate to operate the contact assembly; and a transmission unit arranged between the shafts and comprising: a plurality of gears coupled to the shafts to enable the shafts to rotate with a mutual engagement of the plurality of gears; and a holding assembly adapted to hold radial positions of the plurality of gears to ensure the mutual engagement of the plurality of gears. By arranging the holding assembly to hold the radial positions of the gears to ensure the mutual engagement of the plurality of gears, only one input shaft and one transmission unit are enough to transmit large torques sufficient to operate the contact assembly.

23 Claims, 6 Drawing Sheets

(51) Int. Cl.
*H01H 9/00* (2006.01)
*H01H 9/02* (2006.01)
*H01H 31/28* (2006.01)
*H01H 33/02* (2006.01)

(56) References Cited

U.S. PATENT DOCUMENTS

| | | | |
|---|---|---|---|
| 7,790,997 B2* | 9/2010 | Girodet | H01H 33/42 |
| | | | 218/7 |
| 8,624,146 B2 | 1/2014 | Kuhl et al. | |
| 8,642,912 B2* | 2/2014 | Lee | H01H 33/66207 |
| | | | 218/120 |
| 9,251,972 B2* | 2/2016 | Belloni | H01H 9/02 |
| 11,430,622 B2* | 8/2022 | Edvardsen | H01H 33/022 |
| 2011/0000771 A1 | 1/2011 | Corti | |
| 2017/0200574 A1* | 7/2017 | Bresciani | H01H 21/36 |
| 2023/0268139 A1* | 8/2023 | Devarde | H01H 3/06 |
| | | | 200/419 |

FOREIGN PATENT DOCUMENTS

| | | |
|---|---|---|
| CN | 208208643 U | 12/2018 |
| CN | 109285718 A | 1/2019 |
| CN | 208889557 U | 5/2019 |
| CN | 110444419 A | 11/2019 |
| EP | 0843330 A2 | 5/1998 |
| JP | H08264076 A | 10/1996 |
| WO | 2011045043 A1 | 4/2011 |

OTHER PUBLICATIONS

Indian Examination Report; Issued by the Indian Intellectual Property Office; regarding corresponding patent application Serial No. IN 202247012582; dated Sep. 21, 2022; 6 pages.

* cited by examiner

US 11,972,914 B2

DISCONNECTOR FOR SWITCHGEAR

CROSS-REFERENCE TO RELATED APPLICATIONS

This is a national stage application which claims priority to International patent application Serial No.: PCT/CN2020/074493, filed on Feb. 7, 2020; and which is herein incorporated by reference in its entirety.

FIELD

Embodiments of the present disclosure generally relate to switchgear, and more specifically, to a disconnector of the switchgear.

BACKGROUND

In an electric power system, switchgear comprises a combination of electrical disconnector switches, fuses or circuit breakers used to control, protect and isolate electrical equipment. A disconnector is a type of switch operated at a time when current is not flowing through the power system. That is, both the open and closed operations of the disconnector are done when the current is not flowing through the circuit. The disconnectors are primarily used to facilitate the maintenance of a circuit without current.

Disconnectors are widely used in industrial applications, the distribution of electrical power, and other applications. High voltage type disconnectors are utilized in substations for allowing isolation of equipment like transformers and circuit breakers. Disconnectors are used mainly for the purpose of isolation. Disconnectors can be activated either automatically or manually.

A disconnector typically comprises three poles for operating three phases in a circuit, respectively. Each pole typically comprises a frame and two support insulators on which a blade is mounted. The blade can be driven, via a transmission unit, to rotate to thereby close the circuit on a fixed contact located on a side insulator. To ensure that the blades in the three poles can be rotated synchronously, the transmission unit is required to transmit a sufficiently large torque.

The transmission unit typically comprises more than one input shaft which are coupled to an output shaft to undertake the large torque. Clearly, extra sealing and driving means are required to cooperate with the extra input shafts, which increases the cost and the complexity of an assembly. Furthermore, the extra input shafts and corresponding driving means also lead to increased difficulties associated with control of the driving means.

SUMMARY

Embodiments of the present disclosure provide a disconnector and a switchgear to at least in part solve the above and other potential problems.

In a first aspect, a disconnector is provided. The disconnector comprises a contact assembly operable to change a status of a circuit, the disconnector being arranged in the circuit; shafts adapted to be driven to rotate to operate the contact assembly; and a transmission unit arranged between the shafts and comprising: a plurality of gears coupled to the shafts to enable the shafts to rotate with a mutual engagement of the plurality of gears; and a holding assembly adapted to hold radial positions of the plurality of gears to ensure the mutual engagement of the plurality of gears.

By arranging the holding assembly to hold the radial positions of the gears to ensure the mutual engagement of the plurality of gears, only one input shaft and one transmission unit are enough to transmit large torques sufficient to operate the contact assembly, even in a case where the input and output shafts are not coaxial. Accordingly, only one set of components, such as sealing means, drive units, necessary for the input shaft is sufficient. In this way, the complexity of assembly and costs are reduced.

In some embodiments, the shafts comprise an input shaft and an output shaft, and wherein the plurality of gears comprises: a first bevel gear fixedly coupled to the input shaft; a second bevel gear fixedly coupled to the output shaft and adapted to engage with the first bevel gear. This arrangement allows the same arrangements of the poles of the disconnector and the circuit breaker as arranged in the switchgear, to facilitate a reasonable layout in the switchgear and thus reduce the volume of the switchgear.

In some embodiments, the holding assembly comprises a first holding portion coupled to the input shaft to support the first bevel gear; and a second holding portion coupled to the output shaft to support the second bevel gear. This arrangement further ensures the mutual engagement of the plurality of gears.

In some embodiments, at least one of the first and second holding portions comprises a first through-hole with an opening side, so that the corresponding one of the first and second bevel gears can enter the first through-hole via the opening side. In this way, the input and/or output shafts can be arranged in position easily, thereby reducing the assembly costs.

In some embodiments, one of the first and second holding portions comprises a second through-hole for the corresponding one of the first and second bevel gears to be coaxially arranged therein. This arrangement increases integration of the disconnector.

In some embodiments, the holding assembly further comprises a block member adapted to block the opening side to prevent the corresponding one of the first and second bevel gears from coming out. As a result, the first and second bevel gears can be well blocked after being received in the first through-hole via the opening side.

In some embodiments, the first and second holding portions are integrally formed and perpendicular to each other. In this way, the strength and the integration of the holding assembly are improved.

In some embodiments, the disconnector further comprises a housing for receiving at least a part of the contact assembly, the shafts and the transmission unit, wherein the holding assembly is fixed in the housing. The housing can facilitate the installation and transportation of the disconnector as a module.

In some embodiments, the input and output shafts are perpendicular to each other. This arrangement can make the layout in the switchgear more reasonable.

In some embodiments, the contact assembly comprises a first fixed contact and a second fixed contact; and a moving contact rotatably coupled to first fixed contact and adapted to be rotated to connect or disconnect to the first and second fixed contacts to change the status of the circuit.

In some embodiments, the moving contact comprises a pair of blades adapted to clamp the second fixed contact to connect the first and second fixed contacts. This arrangement can improve the contact performance between the moving contact and the second fixed contact.

In some embodiments, at least one of the second fixed contact and the moving contact comprises a plurality of salient points to improve contacts between the second fixed contact and the moving contact.

In some embodiments, the disconnector further comprises one or more insulation blocks, each insulation block arranged between a wall of the housing and the respective one of the first and second fixed contacts. This arrangement can improve the insulation performance of the disconnector.

In some embodiments, the disconnector further comprises a plurality of first protrusions arranged between the insulation blocks and the first and second fixed contacts. In this way, a gap can be formed between the insulation blocks and the respective one of the first and second fixed contacts to facilitate the thermal dissipation of the disconnector.

In some embodiments, the disconnector further comprises a linkage assembly arranged between the moving contact and the shafts to drive the moving contact to rotate with a rotation of the shafts. As a result, the moving contact can be driven to rotate with reduced effort.

In some embodiments, the linkage assembly comprises a first rod fixedly coupled to the shafts; a second rod rotatably coupled to the first rod; and a third rod rotatably coupled to an end of the second rod away from the first rod and fixedly connected to the moving contact via at least one pivot shaft. With the third rod fixed connected to the moving contact, the creep of the third rod in the moving contact can be prevented to maintain a high mechanical performance of the disconnector.

In some embodiments, the at least one pivot shaft comprises an intermediate portion protruding from the third rod and adapted to provide gaps between the third rod and the pair of blades. In this way, the gaps can be formed between the third rod and each of the pair of blades to facilitate the thermal dissipation of the disconnector.

In some embodiments, the at least one pivot shaft further comprises an insertion portion made of a rigid material and adapted to be inserted through the pair of blades. With the insertion of the rigid material inserted through each of the pair of the blades, the interactions between the blades and the thermoplastic can be avoided to further maintain a high mechanical performance of the disconnector.

In some embodiments, the intermediate portion and the insertion portion are arranged coaxially so that contact surfaces between the intermediate portion and the pair of blades are arranged between the pair of blades. In this way, triple-point area issues are optimized for a better dielectric strength.

In some embodiments, the third rod and the intermediate portion are integrally formed of a thermoplastic material, and the rigid material comprises a metal material. This arrangement can make the disconnector lightweight with a high insulation performance.

In some embodiments, the at least one pivot shaft comprises at least two pivot shafts arranged along the third rod. This arrangement can prevent the relative movement between the third rod and the blades, thereby improving the mechanical performance of the disconnector.

In some embodiments, the insertion portion is of a non-circular cross sectional shape to prevent a relative movement between the at least one pivot shaft and the third rod. This arrangement can prevent the relative movement between the third rod and the blades, thereby improving the mechanical performance of the disconnector.

In a second aspect, a switchgear comprising the disconnector as mentioned in the first aspect is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
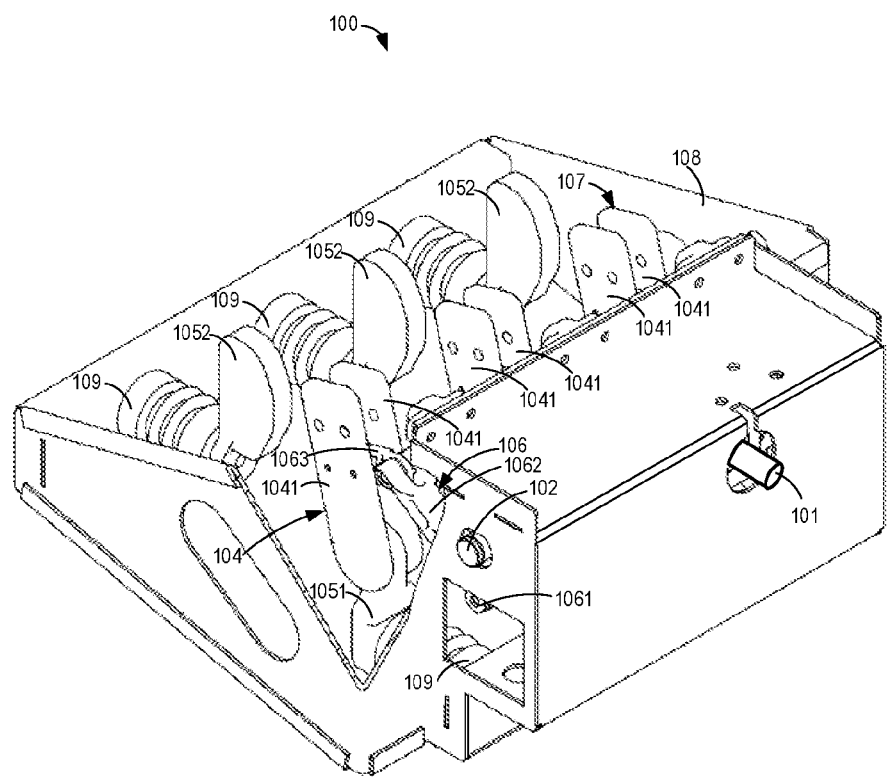
FIG. 1 shows a perspective view of a disconnector as a module according to embodiments of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

As mentioned above, switchgear is a combination of electrical disconnector switches, fuses or circuit breakers used to control, protect and isolate electrical equipment. Switchgear is used to de-energize equipment to allow work to be done and/or to clear faults downstream. This type of equipment is important as it has direct impact on the reliability of the electricity supply.

A disconnector used in the switchgear typically comprises three poles for operating three phases in a circuit, respectively. Each pole typically comprises a frame and two support insulators on which the blade is mounted. The blade can be driven, by a drive unit, to rotate about its own longitudinal axis to thereby close the circuit on a fixed contact located on the side insulator. The blades in the three poles need to be rotated synchronously.

To achieve the synchronous rotation of the blades, a transmission unit is required between the drive unit and the blades to transmit a sufficiently large torque. In some conventional solutions, such a transmission unit comprises an output shaft adapted to drive the blade to rotate via a linkage mechanism. Furthermore, to transmit the large torque, there are at least two input shafts perpendicular to the output shaft and between the output shaft and the drive unit. The large torque can be evenly distributed to the input shafts and the gears between the output shaft and each of the input shafts.

In addition to the extra input shaft, some associated components need to be provided for each input shaft, including sealing means, a drive unit, a transmission unit or the like. It will be appreciated that cost and complexity of the assembling processes will increase. Moreover, excessive sealing means are more likely to cause a seal failure. To solve these problems, in some conventional solutions where only one input shaft is used, the input shaft is provided to be coaxial to the output shaft to transmit the large torque. For example, the output shaft is integrated with the input shaft to be driven directly by the drive unit.

However, the disconnector with the coaxial input and output shafts introduces problems arising from the different orientations of the circuit breaker and the disconnector in the switchgear. Specifically, the coaxial input and output shafts of the disconnector result in the same arrangement direction of the three poles as an extending direction of the input or output shaft. For example, in a case where the input shaft is coaxial to the output shaft, the arrangement direction of the three poles of the disconnector is typically from front to rear of the switchgear. On the contrary, the arrangement direction of the three poles of the circuit breaker is from left to right of the switchgear. As a result, wiring between the circuit breaker and the disconnector becomes complicated and takes up a lot of space, resulting in a large volume of the switchgear and inconvenience of the circuit layout in the switchgear. In addition, more connection elements such as copper bars need to be connected between the circuit breaker and the disconnector.

Moreover, in the switchgear, triple-point areas, namely, triangular junctions, inevitably exist in regions between thermoplastic components and conductive components contacting each other. In the conventional solutions, the triple-point areas are located in the areas where a thermoplastic rod of the link mechanism contacts the blade. Specifically, the triple-point areas are directly exposed to the neighbor pole and to the earth, leading to relatively high field strengths. As a result, the distances between the poles and between the earth and each pole need to be large enough to meet the dielectric requirements.

Furthermore, in the conventional solutions, the thermoplastic rod of the link mechanism is connected to the blade via a single cylindrical pin made of thermoplastic material. Consequently, to drive the blade to rotate, there are mechanical interactions between the cylindrical pin and the blade. Furthermore, the mechanical interactions may lead to a deformation or a creep of the thermoplastic cylindrical pin. As a result, there may be a relative movement between the thermoplastic rod and the blade, which causes a deteriorated mechanical performance of the disconnector.

In some conventional solutions, a clamp structure is provided on the thermoplastic rod to clamp the blade, so that the movements of the cylindrical pin relative to the blade are prevented. However, with the long-time operation, the inevitable mechanical interactions between the lamp structure or the cylindrical pin and the blade may also lead to a creep of the thermoplastic material, which in turn results in a relative movement between the thermoplastic rod and the blade. Furthermore, the clamp structure also exacerbates the above mentioned triple-point area problem.

In addition, due to tight contacts and the absence of efficient cooling means between the blade and the thermoplastic rod of the link mechanism, the heat generated by the blade cannot be easily dissipated. The continuous accumulation of heat causes the temperature to rise, which in turn makes the above problems worse.

In order to at least in part solve the above and other potential problems, embodiments of the present disclosure provide a disconnector 100 that can be arranged, as an integrated modular, in a switchgear. In some embodiments, the disconnector 100 may be a three-position disconnector or switch which is used in a medium-voltage switchgear. In the following, the idea of the present disclosure will be described using a three-position disclosure as an example. It is to be understood that other types of disconnectors are also applicable, as long as it has an appropriate similar structures. FIG. 1 shows a perspective view of a disconnector 100 as a module; and FIG. 2 shows a perspective view of shafts 101, 102 and a transmission unit 103 of the disconnector 100.

As shown, the disconnector 100 according to embodiments of the present disclosure generally comprises a contact assembly 107, shafts 101, 102 and a transmission unit 103 arranged between the shafts 101, 102. The contact assembly 107 is operable to change a status of a circuit where the disconnector 100 is arranged. In some embodiments, the contact assembly 107 may comprise two fixed contacts and a moving contact 104.

As shown in FIG. 1, the fixed contacts include a first fixed contact 1051 and a second fixed contact 1052. The moving contact 104 is rotatably coupled to the first fixed contact 1051 and can be rotated to connect or disconnect the first and second fixed contacts 1051, 1052 to change the status of the circuit. As shown in FIG. 1, disconnecting of the first and second fixed contacts 1051, 1052 makes sure that the circuit is not triggered in order to perform maintenance.

Figure 2:
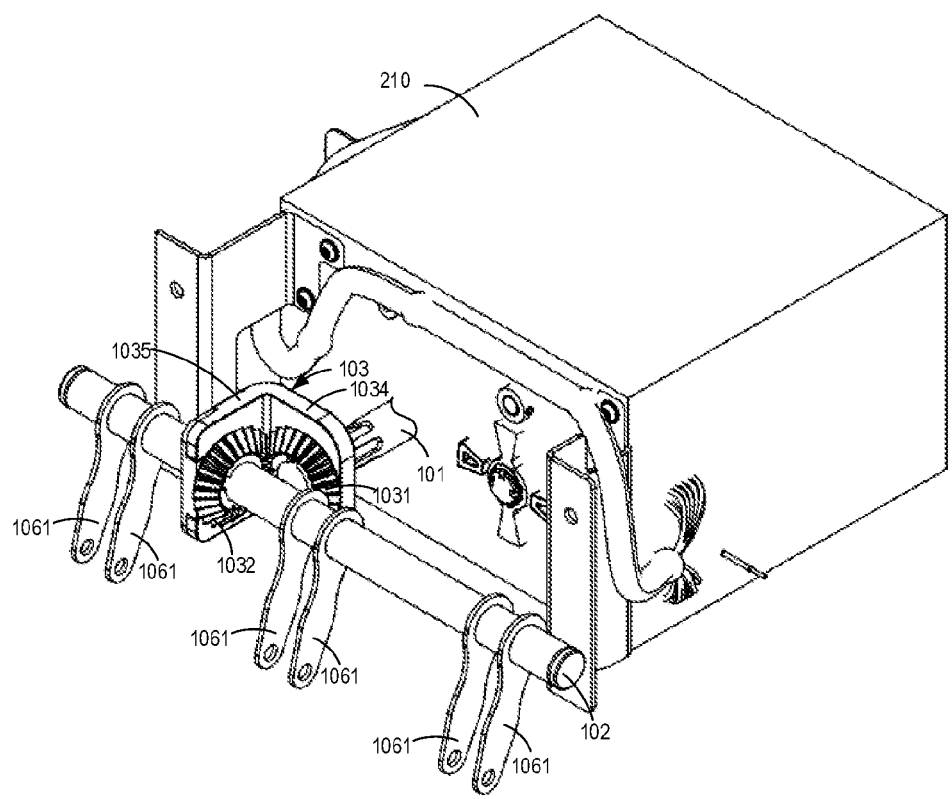
FIG. 2 shows a perspective view of shafts and a transmission unit of the disconnector according to embodiments of the present disclosure.

In some embodiments, as shown in FIG. 2, the shafts comprise an input shaft 101 and an output shaft 102. The input shaft 101 may be driven by a drive unit 210, for example. The drive unit 210 in some embodiments may comprise a motor and/or a series of transmission means. For example, the input shaft 101 may be coupled to the motor via a reducer.

The transmission unit 103 is arranged between the first and second shafts 101, 102 to transmit torque. In some embodiments, the transmission unit 103 may comprise a plurality of gears coupled to the first and second shafts 101, 102, respectively. In this way, the second shaft 102 can be rotated with a rotation of the first shaft 101 with a mutual engagement of the plurality of gears.

Unlike the conventional solutions, the transmission unit 103 further comprises a holding assembly 1033 arranged on the first and second shafts 101, 102 to hold radial positions of the plurality of gears. As a result, a stable engagement between the plurality of gears can be guaranteed by avoiding tooth skipping of the gears due to the large torque.

With the holding assembly 1033, the large torque can be transmitted from the input shaft 101 to the output shaft 102 even in a case where one input shaft 101 is not coaxial with the output shaft 102. In comparison to the conventional cases where at least two input shafts are needed, at least one input shaft 101 and corresponding components such as sealing means, drive components or the like for the extra shaft can be omitted. As a result, assembly costs and material costs are reduced significantly.

Furthermore, in comparison to the conventional disconnector in which the input and output shafts are coaxial or parallel, the disconnector 100 according to embodiments of the present disclosure can have an arrangement of the poles the same as that of the circuit breaker arranged in the switchgear. In this way, the layout in the switchgear can be more reasonable and a more compact switchgear can be achieved.

FIG. 2 shows a perspective view of shafts 101, 102 and the transmission unit 103. As shown, the plurality of gears may comprise a first bevel gear 1031 fixedly coupled to the input shaft 101, and a second bevel gear 1032 fixedly coupled to the output shaft 102. The term "fixedly" means that there is no relative movement between the components fixedly coupled or connected to each other during the operation. For example, in some embodiments, the fixed relationship between the gear and the shaft can be achieved by a key and groove structure. The first and second bevel gears 1031, 1032 can be engaged with each other to transmit torque from the input shaft 101 to the output shaft 102.

Figure 3:
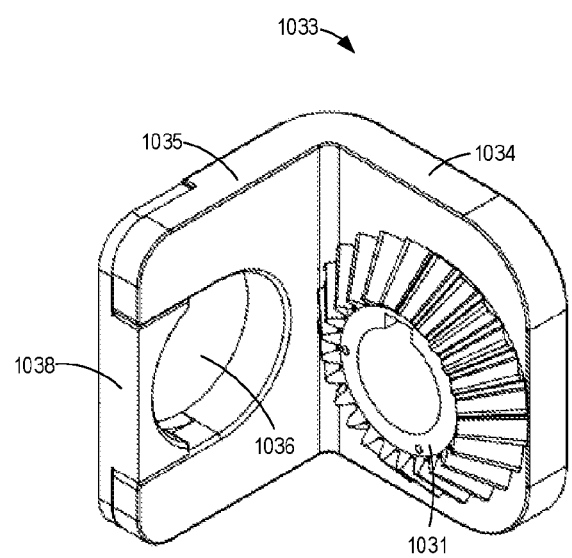
FIG. 3 shows a perspective view of a holding assembly of the transmission unit according to further embodiments of the present disclosure.
Figure 4:
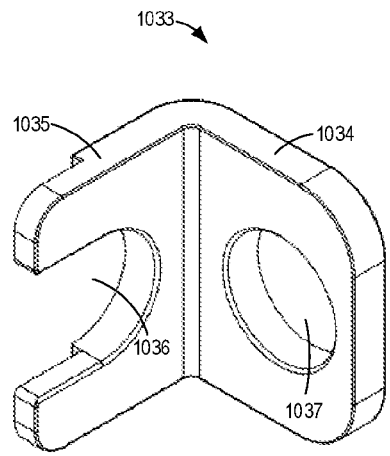
FIGS. 4 and 5 show perspective views of holding assemblies according to different embodiments of the present disclosure.
Figure 5:
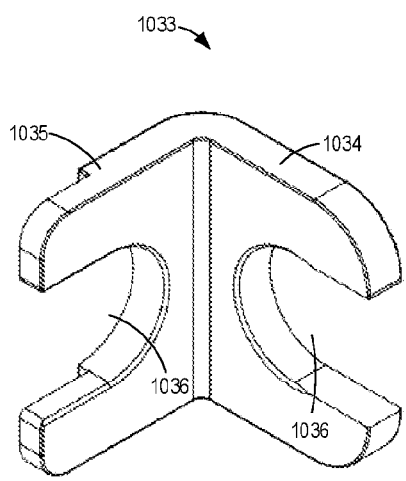

In some embodiments, the holding assembly 1033 may comprise a first holding portion 1034 and a second holding portion 1035. The first and second holding portions 1034, 1035 are coupled to the first and second shafts 101, 102 to support the first and second bevel gears 1031, 1032, respectively, as shown in FIGS. 2-5. FIG. 3 shows a perspective view of the holding assembly 1033 of the transmission unit 103; and FIGS. 4 and 5 show perspective views of holding assemblies 1033.

As shown, in some embodiments, each of the first and second holding portions 1034, 1035 may include a through-hole to allow the respective one of the first and second bevel gears 1031, 1032 to be arranged therein. A cooperation part of each of the first and second bevel gears 1031, 1032 can be arranged in the respective through-hole, as shown in FIG. 3. In some embodiments, the cooperation part may be a circular protrusion protruding from an opposite side from the bevel teeth. The through-hole may have a diameter equal to or substantially equal to or slightly larger than a diameter of the cooperation part of the gears. In this way, the radial positions of the first and second bevel gears 1031, 1032 can be ensured, to thereby prevent the tooth skipping of the gears due to the large torque.

To facilitate the arrangement of the cooperation part of the first or second bevel gears 1031, 1032 in the through-hole, the through-hole (referred to as a first through-hole 1036 for ease of discussion) of the first and/or second holding portions 1034, 1035 may comprise an opening side. In this way, the cooperation part of the first or second bevel gears 1031, 1032 can be arranged in the first through-hole 1036 via the opening side.

As shown in FIG. 3, the opening side may be blocked by a block member 1038. As a result, the first and second bevel gears 1031, 1032 can be well blocked after being received in the first through-hole. In some embodiments, the block member 1038 may be coupled to the first or second holding portion 1034, 1035 via a snap connection, bolts, rivets or the like.

In some embodiments, both of the through-holes of the first and second holding portions 1034, 1035 may comprise opening sides, respectively, as shown in FIG. 5. In this way, the first and second bevel gears 1034, 1035 can be easily arranged in the first through-holes 1036. In some alternative embodiments, as shown in FIG. 4, one of the first and second holding portions may comprise a second through-hole 1037 without an opening side.

During the assembling of the first and second bevel gears 1034, 1035 in the first and second through-holes 1036, 1037, one of the first and second bevel gears 1034, 1035 may be first axially inserted into the second through-hole 1037. After that, the other of the first and second bevel gears 1034, 1035 may then be inserted into the first through-hole 1036 via the opening side. Then the block member 1038 may be provided to block the opening side.

In some embodiments, the first and second holding portions 1034, 1035 may be integrally formed and perpendicular to each other. For example, the holding assembly 1033 may be formed by bending a piece of metal plate. In some alternative embodiments, the holding assembly may also be integrally formed by molding or the like.

It is to be understood that the above embodiments where the holding assembly 1033 is integrally formed are merely for the purpose of illustration, without suggesting any limitation as for the scope of the present disclosure. Any other suitable approaches to form the holding assembly are also possible. For example, in some embodiments, the holding assembly 1033 may be formed by assembling the first and second holding portion 1034, 1035 via suitable fastening means, such as welding, bolts, rivets, snap connections, or the like.

Referring back to FIG. 1, in some embodiments, the disconnector 100 may comprise a housing 108 for receiving at least a part of the contact assembly 107, the shafts and the transmission unit 103. The holding assembly 1033 may be fixed to a wall of the housing 108 via bolts, rivets or the like. In this way, the disconnector 108 can be arranged in the switchgear 200 as an integrated module. An end of the input shaft 101 may be arranged to facilitate the coupling to the drive unit, as shown in FIG. 1.

In some embodiments, the housing 108 may comprise multiple compartments for arranging the contact assembly 107 and the shafts and the transmission unit 103, respectively. As a result, the insulation performance of the disconnector 100 can be improved.

Referring back to FIG. 1, in some embodiments, the moving contact 104 may comprise a pair of blades 1041 that can clamp the second fixed contact 1052 to connect the first and second fixed contacts 1051, 1052. This arrangement can improve the contact performance between the moving contact 104 and the second fixed contact 1052.

In some embodiments, to further improve the contact performance between the moving contact 104 and the second fixed contact 1052, at least one of the second fixed contact 1052 and the moving contact 104 may comprise a plurality of salient points. For example, in some embodiments, a plurality of salient points, for example, three or four salient points are arranged on an inner surface of each of the pair of blades 1041. In this way, the contact performance between the second fixed contact 1052 and the moving contact 104 may be further improved.

Figure 6:
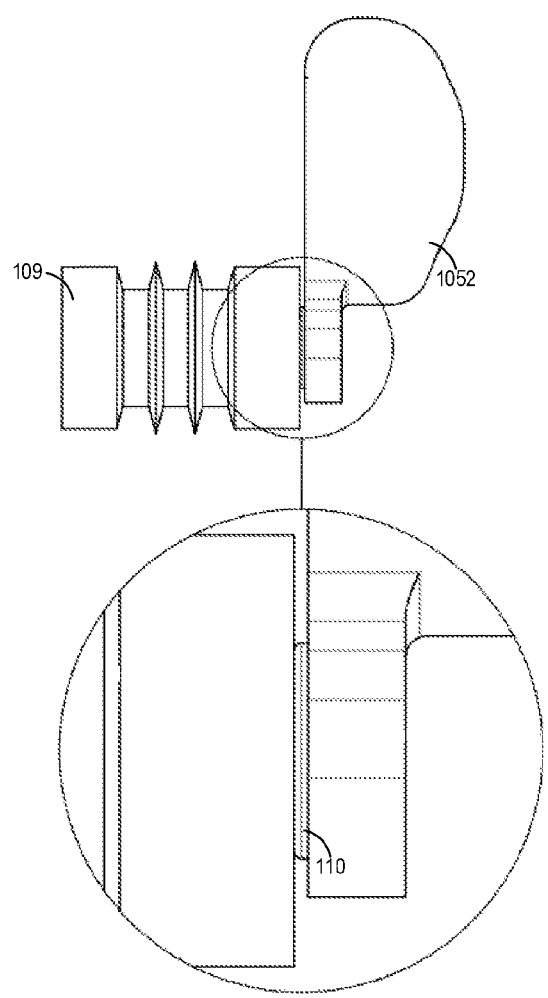
FIG. 6 shows a side view of an insulation block and a second fixed contact and an enlarged view of the area between the insulation block and the second fixed contact according to embodiments of the present disclosure.
Figure 7:
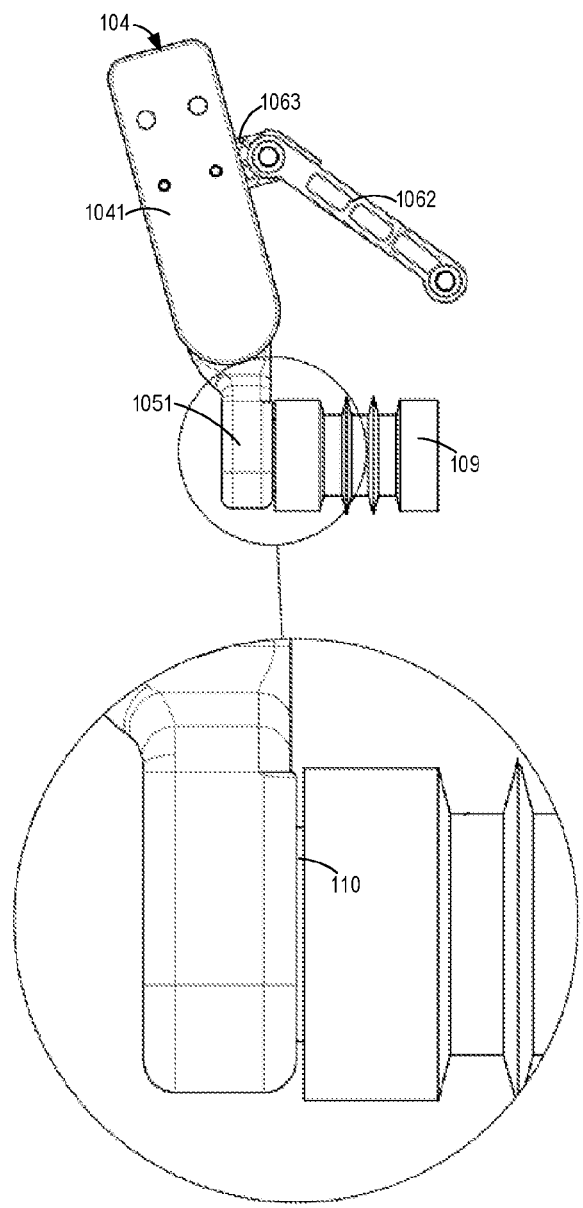
FIG. 7 shows a side view of an insulation block and a first fixed contact and an enlarged view of the area between the insulation block and the first fixed contact according to embodiments of the present disclosure.

As shown in FIGS. 1 and 6, in some embodiments, to improve the insulation performance of the disconnector 100, a plurality of insulation blocks 109 may be provided. Each insulation block 109 may be arranged between a wall of the housing 108 and the respective one of the first and second fixed contacts 1051, 1052. As shown in FIGS. 6 and 7, in some embodiments, each insulation block 109 may comprise a plurality of ring-shaped protrusions arranged axially to further increase the creepage distance to thereby improve the insulation performance.

In some embodiments, as shown in FIGS. 6 and 7, the disconnector 100 may further comprise a plurality of protrusions 110 arranged between the insulation blocks 109 and the first and second fixed contacts 1051, 1052. For example, as shown in FIG. 6, there is a protrusion 110 between the insulation block 109 and the second fixed contact 1052. Similarly, as shown in FIG. 7, a protrusion 110 is also formed between the insulation block 109 and the first fixed contact 1051.

On the one hand, the protrusion 110 can form a gap between each of the insulation blocks 109 and the respective one of the first and second fixed contacts 1051, 1052 to improve air convection. In this way, the heat dissipation nearby the fixed contacts can be improved.

On the other hand, the protrusion 110 allows the contact surface of the thermoplastic component and the fixed contact to be smaller and located more inside. As a result, the triple-point area produces a lower electric field compared to the conventional solutions without the protrusion. In this way, the dielectric strength between poles and between the pole and earth can be increased with a same distance.

Referring back to FIG. 1, in some embodiments, the moving contact 104 may be driven by the drive unit 210 via a linkage assembly 106. The linkage assembly 106 may be coupled between the moving contact 104 and the output shaft 102. In this way, the moving contact 104 can be driven to rotate with a rotation of the output shaft 102.

As shown in FIGS. 1, 6 and 7, in some embodiments, the linkage assembly 106 may comprise three rods, namely, a first rod 1061, a second rod 1062 and a third rod 1063, respectively. The first rod 1061 is fixedly coupled to the output shaft 102 and can be rotated with a rotation of the output shaft 102.

The second rod 1062 is rotatably arranged between the first and third rods 1061, 1063. Different from the conventional solutions, the third rod 1063 is fixedly coupled to the moving contact 104 via at least one pivot shaft 1064. For example, during the rotation of the moving contact 104, according to embodiments of the present disclosure, it can be ensured that there is no relative movement between the third rod 1063 and the moving contact 104.

On the one hand, this arrangement can reduce the torque needed to drive the moving contact 104 to rotate. In this way, the moving contact 104 can be driven more easily. On the other hand, the fixed relationship between the third rod 1063 and the moving contact 104 prevents the creep of the third rod 1063 which is made of thermoplastic material, to further improve the mechanical performance of the disconnector.

Furthermore, as mentioned above, in the conventional solutions, the rotation of the blade is directly driven by the mechanical interactions between the thermoplastic cylindrical pin and the blade. However, with the long-time operation, the inevitable mechanical interactions lead to creep of the thermoplastic material which results in a relative movement between the thermoplastic rod and the blade. As a result, the mechanical performance of the disconnector is degraded.

Figure 8:
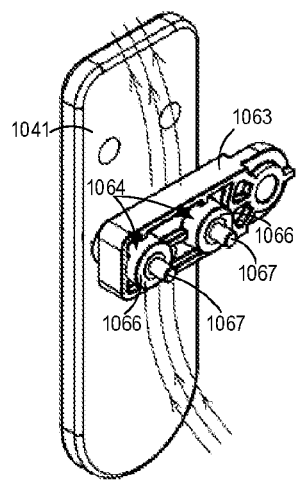
FIG. 8 shows a perspective view of a third rod and one of the pair of blades to show how the thermal flow is dissipated via gaps formed between the third rod and the pair of blades according to embodiments of the present disclosure.
Figure 9:
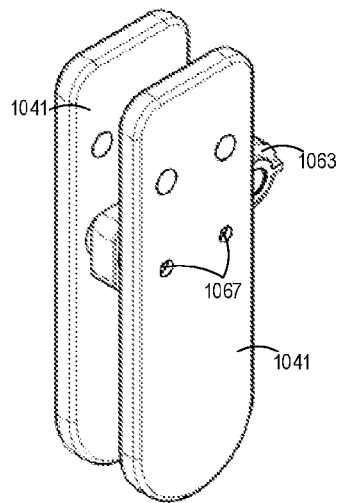
FIG. 9 shows a perspective view of a third rod and the pair of blades according to embodiments of the present disclosure.

According to embodiments of the present disclosure, the fixed relationship between the third rod 1063 and the moving contact 104 can be ensured in the following ways. Specifically, in some embodiments, the pivot 1064 may also comprise an insertion portion 1067, as shown in FIGS. 8 and 9. The insertion portion 1067 may be made of a rigid material such as a metal material and adapted to be inserted through each of the pair of the blades 1041. In this way, the blades 1041 can be driven to rotate by interactions between the insertion portions 1067 made of the rigid material and the blades 1041. Accordingly, there is almost no interaction between other parts of the third rod 1063 which are made of the thermoplastic material and the blades 1041.

That is, the interactions between the thermoplastic material and the blades 1041 is minimized since creeps unlikely occur on the thermoplastic material in this case. In this way, the parts of the pivot shaft 1064 other than the insertion portion 1067 are unlikely to be deformed. As a result, the mechanical performance of the linkage assembly 106 and even the disconnector may be maintained at a high level.

Figure 10:
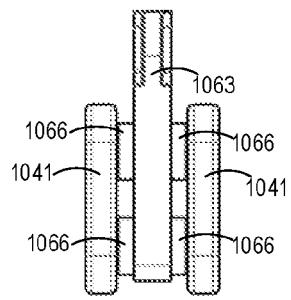
FIG. 10 shows a top view of a third rod and the pair of blades according to embodiments of the present disclosure.

To further prevent the relative movement between the third rod 1063 and the blade 1041, in some embodiments, there are at least two pivot shafts 1064 arranged along the third rod 1063, as shown in FIGS. 8-10. Two shafts can efficiently limit the relative rotation of the third rod 1063 about one of the shafts. In this way, there is no relative movement between the moving contact 104 and the third rod 1063. In some alternative embodiments, only one pivot shaft can also achieve the fixed relationship between the third rod 1063 and the moving contact 104.

For example, in some embodiments, the insertion portion 1067 may be of a non-circular cross sectional shape, to prevent the relative movement between the pivot shaft 1064 and the third rod 1063. This arrangement can simplify the structure of the third rod 1063.

In some embodiments, the insertion portion 1067 may be a metal pin arranged in the third rod 1063 and coaxially to the intermediate portion 1066. For example, the third rod 1063 can be formed in a mold where the metal pin as the insertion portion 1067 is placed in a suitable position.

Furthermore, due to the fixed relationships between output shaft 102 and the first rod 1061 and between the third rod 1063 and the blade 1041, the position of the moving contact 104 is determined according to the positions of the first and second bevel gears 1031, 1032. Thus, to ensure the open position of the moving contact 104, during the assembling of the transmission unit 103, the angular position of one of the first and second bevel gears 1031, 1032 may be aligned with a predetermined angular position of the other.

Moreover, in some embodiments, to improve heat dissipation between the blades 1041 and the third rod 1063, as shown in FIGS. 8 and 10, the pivot shaft 1064 may comprise an intermediate portion 1066 protruding from the third rod 1063. The intermediate portion 1066 provides a gap between the third rod 1063 and each of the pair of blades 1041, as shown in FIG. 8. The gap can provide an air passage nearby the blade 1041 to facilitate the air convection. In this way, heat generated by the blade 1041 can be dissipated through the gaps by radiation and convection. As a result, the heat does not easily accumulate and thus the heat radiation performance is improved.

In some embodiments, the third rod 1063 and the intermediate portion 1066 may be integrally formed of a thermoplastic material. This arrangement can improve the mechanical strength of the third rod 1063 and reduce the manufacturing and assembly costs. In some alternative embodiments, the third rod 1063 and the intermediate portion 1066 may also be formed separately and assembled together with suitable fastening means, such as bolts or rivets. This arrangement can increase the flexibility of the arrangement of the pivot shafts 1064 on the third rod 1063.

Furthermore, in some embodiments, the intermediate portion 1066 may be arranged to ensure contact surfaces of the intermediate portion and the pair of the blades 1041 to be entirely arranged between the pair of blades 1041. In this way, the three-point area between the blade 1041 and the intermediate portion 1066 made of thermoplastic material is entirely located between the pair of blades 1041.

As a result, the three-point area is shielded in a metal shield formed by the pair of blades 1041, resulting in a relatively low electric field between the blade 1041 and the intermediate portion 1066. Furthermore, clearances between some components such as moving contacts 104 to meet the insulation performance may be reduced, which facilitates the compact design of the disconnector 100.

Embodiments of the present disclosure further provide a switchgear comprising a disconnector as mentioned above. With the disconnector according to embodiments of the present disclosure, the switchgear can be made more compact and have a better insulation performance. As mentioned above, in some embodiments, the disconnector may be a three-position disconnector or switch used in a medium-voltage switchgear.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A disconnector, comprising:
   a contact assembly operable to change a status of a circuit, the disconnector being arranged in the circuit;
   shafts adapted to be driven to rotate to operate the contact assembly; and
   a transmission unit arranged between the shafts and comprising:
   a plurality of gears coupled to the shafts to enable the shafts to rotate with a mutual engagement of the plurality of gears; and
   a holding assembly adapted to hold radial positions of the plurality of gears to ensure the mutual engagement of the plurality of gears.

2. The disconnector of claim 1, wherein the shafts comprise an input shaft and an output shaft, and
   wherein the plurality of gears comprises:
   a first bevel gear fixedly coupled to the input shaft;
   a second bevel gear fixedly coupled to the output shaft and adapted to engage with the first bevel gear.

3. The disconnector of claim 2, wherein the holding assembly comprises:
   a first holding portion coupled to the input shaft to support the first bevel gear; and
   a second holding portion coupled to the output shaft to support the second bevel gear.

4. The disconnector of claim 3, wherein at least one of the first and second holding portions comprises a first through-hole with an opening side, so that the corresponding one of the first and second bevel gears can enter the first through-hole via the opening side.

5. The disconnector of claim 4, wherein one of the first and second holding portions comprises a second through-hole for the corresponding one of the first and second bevel gears to be coaxially arranged therein.

6. The disconnector of claim 4, wherein the holding assembly further comprises a block member adapted to block the opening side to prevent the corresponding one of the first and second bevel gears from coming out.

7. The disconnector of claim 3, wherein the first and second holding portions are integrally formed and perpendicular to each other.

8. The disconnector of claim 1, further comprising a housing for receiving at least a part of the contact assembly, the shafts and the transmission unit,
   wherein the holding assembly is fixed in the housing.

9. The disconnector of claim 2, wherein the input and output shafts are perpendicular to each other.

10. The disconnector of claim 8, wherein the contact assembly comprises:
    a first fixed contact and a second fixed contact; and
    a moving contact rotatably coupled to first fixed contact and adapted to be rotated to connect or disconnect the first and second fixed contacts to change the status of the circuit.

11. The disconnector of claim 10, wherein the moving contact comprises a pair of blades adapted to clamp the second fixed contact to connect the first and second fixed contacts.

12. The disconnector of claim 10, wherein at least one of the second fixed contact and the moving contact comprises a plurality of salient points to enhance contact performance between the second fixed contact and the moving contact.

13. The disconnector of claim 10, further comprising one or more insulation blocks, each insulation block arranged between a wall of the housing and the respective one of the first and second fixed contacts.

14. The disconnector of claim 13, further comprising a plurality of protrusions arranged between the insulation blocks and the first and second fixed contacts.

15. The disconnector of claim 11, further comprising a linkage assembly arranged between the moving contact and the shafts to drive the moving contact to rotate with a rotation of the shafts.

16. The disconnector of claim 15, wherein the linkage assembly comprises:
    a first rod fixedly coupled to the shafts;
    a second rod rotatably coupled to the first rod; and
    a third rod rotatably coupled to an end of the second rod away from the first rod and fixedly connected to the moving contact via at least one pivot shaft.

17. The disconnector of claim 16, wherein the at least one pivot shaft comprises:
    an intermediate portion protruding from the third rod and adapted to provide a gap between the third rod and each of the pair of blades.

18. The disconnector of claim 17, wherein the at least one pivot shaft further comprises:
    an insertion portion made of a rigid material and adapted to be inserted through each of the pair of blades.

19. The disconnector of claim 18, wherein the intermediate portion and the insertion portion are arranged coaxially so that contact surfaces between the intermediate portion and the pair of blades are arranged between the pair of blades.

20. The disconnector of claim 17, wherein the third rod and the intermediate portion are integrally formed of a thermoplastic material, and the rigid material comprises a metal material.

21. The disconnector of claim 16, wherein the at least one pivot shaft comprises at least two pivot shafts arranged along the third rod.

22. The disconnector of claim 19, wherein the insertion portion is of a non-circular cross sectional shape to prevent a relative movement between the at least one pivot shaft and the third rod.

23. A switchgear comprising the disconnector of claim 1.

\* \* \* \* \*